(12) United States Patent
Kang et al.

(10) Patent No.: US 10,419,994 B2
(45) Date of Patent: Sep. 17, 2019

(54) NON-ACCESS STRATUM BASED ACCESS METHOD AND TERMINAL SUPPORTING THE SAME

(71) Applicant: ELECTRONICS AND TELECOMMUNICATIONS RESEARCH INSTITUTE, Daejeon (KR)

(72) Inventors: Yoo Hwa Kang, Daejeon (KR); No Ik Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/480,539

(22) Filed: Apr. 6, 2017

(65) Prior Publication Data

US 2017/0295529 A1 Oct. 12, 2017

(30) Foreign Application Priority Data

Apr. 8, 2016 (KR) ......................... 10-2016-0043554
Mar. 27, 2017 (KR) ......................... 10-2017-0038743

(51) Int. Cl.
*H04L 12/46* (2006.01)
*H04L 12/66* (2006.01)
(Continued)

(52) U.S. Cl.
CPC ......... *H04W 36/14* (2013.01); *H04L 12/4633* (2013.01); *H04L 12/66* (2013.01);
(Continued)

(58) Field of Classification Search
CPC ..... H04W 36/14; H04W 76/12; H04W 12/02; H04W 48/00; H04W 12/04; H04W 84/12; H04L 63/072; H04L 61/2015; H04L 69/03; H04L 12/4633; H04L 12/66; H04L 63/164

See application file for complete search history.

(56) References Cited

U.S. PATENT DOCUMENTS 8,416,744 B2 4/2013 Becker et al.
9,055,563 B2 6/2015 Tan et al.
(Continued)

FOREIGN PATENT DOCUMENTS

KR 10-2015-0083406 A 7/2015

OTHER PUBLICATIONS

3rd Generation Partnership Project; Technical Specification Group Services and System Aspects; Architecture enhancements for non-3GPP accesses, 3GPP TS 23.402 V14.3.0 (Mar. 2017).
(Continued)

*Primary Examiner* — Brandon J Miller
(74) *Attorney, Agent, or Firm* — LRK Patent Law Firm

(57) ABSTRACT

A non-access stratum based access method and a terminal supporting the same. The terminal receives an Internet protocol (IP) address allocated from a first gateway included in a non-3$^{rd}$ generation partnership project (3GPP) access network. In addition, the terminal applies a non-access stratum (NAS) protocol to a first device managing mobility of the terminal through the IP address.

15 Claims, 10 Drawing Sheets

(51) Int. Cl.
*H04L 29/06* (2006.01)
*H04L 29/12* (2006.01)
*H04W 12/02* (2009.01)
*H04W 12/04* (2009.01)
*H04W 36/14* (2009.01)
*H04W 48/00* (2009.01)
*H04W 76/12* (2018.01)
*H04W 84/12* (2009.01)
*H04W 12/00* (2009.01)

(52) U.S. Cl.
CPC ...... *H04L 61/2015* (2013.01); *H04L 63/0272* (2013.01); *H04L 69/03* (2013.01); *H04W 12/001* (2019.01); *H04W 12/04* (2013.01); *H04W 48/00* (2013.01); *H04W 76/12* (2018.02); *H04L 63/164* (2013.01); *H04W 84/12* (2013.01)

(56) References Cited

U.S. PATENT DOCUMENTS

| | | | | |
|---|---|---|---|---|
| 9,906,992 | B1* | 2/2018 | Youtz | H04W 36/0033 |
| 2008/0316972 | A1* | 12/2008 | Shaheen | H04W 36/0033 |
| | | | | 370/331 |
| 2010/0199332 | A1* | 8/2010 | Bachmann | H04L 63/0428 |
| | | | | 726/4 |
| 2012/0204253 | A1* | 8/2012 | Sugimoto | H04L 12/4633 |
| | | | | 726/12 |
| 2012/0215931 | A1* | 8/2012 | Touati | H04L 63/162 |
| | | | | 709/229 |
| 2012/0269167 | A1* | 10/2012 | Velev | H04W 36/0011 |
| | | | | 370/331 |
| 2013/0039337 | A1* | 2/2013 | Hwang | H04W 36/0066 |
| | | | | 370/331 |
| 2013/0095796 | A1* | 4/2013 | Cho | H04W 4/14 |
| | | | | 455/411 |
| 2013/0128864 | A1* | 5/2013 | Kim | H04W 36/14 |
| | | | | 370/331 |
| 2013/0290722 | A1* | 10/2013 | Kall | H04L 12/4633 |
| | | | | 713/171 |
| 2014/0317223 | A1 | 10/2014 | Park et al. | |
| 2015/0334622 | A1* | 11/2015 | Baboescu | H04W 36/14 |
| | | | | 370/331 |
| 2015/0341830 | A1* | 11/2015 | Jeong | H04W 24/02 |
| | | | | 370/329 |
| 2015/0382393 | A1* | 12/2015 | Kiss | H04W 76/16 |
| | | | | 370/328 |
| 2016/0088676 | A1* | 3/2016 | Zhao | H04L 63/0876 |
| | | | | 370/328 |
| 2016/0219625 | A1 | 7/2016 | Lee et al. | |
| 2016/0234726 | A1 | 8/2016 | Nuggehalli et al. | |
| 2017/0223538 | A1* | 8/2017 | Hahn | H04W 8/20 |
| 2017/0272991 | A1* | 9/2017 | Karpov | H04W 36/14 |
| 2017/0332296 | A1* | 11/2017 | Nilsson | H04W 36/36 |

OTHER PUBLICATIONS

3rd Generation Partnership Project; Technical Specification Group Core Network and Terminals; Non-Access-Stratum (NAS) protocol for Evolved Packet System (EPS); Stage 3, 3GPP TS 24.301 V14.3.0 (Mar. 2017).

USPTO office Action dated Aug. 1, 2019 for U.S. Appl. No. 16/507,594, which corresponds to the above-identified US Patent Application.

* cited by examiner

NON-ACCESS STRATUM BASED ACCESS METHOD AND TERMINAL SUPPORTING THE SAME

CROSS-REFERENCE TO RELATED APPLICATION

This application claims priority to and the benefit of Korean Patent Application Nos. 10-2016-0043554 and 10-2017-0038743, filed in the Korean Intellectual Property Office on Apr. 8, 2016 and Mar. 27, 2017, respectively, the entire contents of which are incorporated herein by reference.

BACKGROUND OF THE INVENTION

1. Field of the Invention

The present invention relates to a non-access stratum based access method and a terminal supporting the same.

2. Description of Related Art

A $3^{rd}$ generation partnership project (3GPP) standard provides a structure standard for interworking of a long term evolution (LTE) network and a non-3GPP access network (for example, wireless broadband (WiBro), wireless fidelity (WiFi), or the like). As technology of offloading WiFi to the LTE network using an LTE network infrastructure, there are an evolved packet data network (PDN) gateway (ePDG) standard (3GPP Rel-8) and a trusted wireless local area network (WLAN) access gateway (TWAG) standard (3GPP Rel-11). In addition, there is an Internet protocol (IP) flow mobility (IFOM) standard (3GPP Rel-10) capable of simultaneously using the LTE and the WiFi.

In the ePDG standard, an ePDG is added for the purpose of interworking between a 3GPP core network and a WiFi access network. A terminal performs an authentication procedure such as extensible authentication protocol-authentication and key agreement (EAP-AKA), or the like, on the WiFi network, and then receives an IP address allocated from the ePDG to create an Internet protocol security (IPSec) tunnel with the ePDG. In addition, the ePDG creates a generic routing encapsulation (GRE) tunnel with a PDN gateway (P-GW) through a proxy mobile IPv6 (PMIPv6) protocol.

In a network structure of the TWAG standard for removing dependency of the terminal and interworking a WLAN with the LTE, the terminal performs only a WLAN access function using a 802.1X authentication procedure. In addition, the TWAG performs Internet key exchange (IKE)/IPsec connection with the WiFi network, and may create a GRE tunnel with the P-GW.

The IFOM standard is technology capable of transmitting data of a single access point name (APN) service traffic to the LTE and the WLAN. In the case in which the terminal interworks with the ePDG or the TWAG to perform an access through the WLAN, a dual-stack mobile IPv6 (DSMIPv6) signaling and IP-in-IP tunnel is created through encrypted connection of Internet key exchange 2 (IKEv2)/IPsec.

According to the methods according to the related art described above, in the case in which the 3GPP LTE network and the non-3GPP access network interwork with each other, a general packet radio service (GPRS) tunneling protocol (GTP)-C/U or PMIPv6/GRE, DSMIPv6/IP-in-IP tunnel based mobility function is applied to the non-3GPP access network instead of a mobility function of the LTE network. Therefore, there is a problem that it is difficult to provide seamless handover.

In the LTE network, a non-access stratum (NAS), which is a protocol stack between the terminal and a core network, performs session management for communication and mobility management of the terminal. Currently, the terminal supporting the NAS may receive the seamless handover through the LTE network, but an NAS access is not supported to the terminal in the non-3GPP access network such as the WiFi.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a non-access stratum based access method and a terminal supporting the same having advantages of providing seamless handover even in various access networks.

An exemplary embodiment of the present invention provides a method for accessing a core network through a non-$3^{rd}$ generation partnership project (3GPP) access network by a terminal. The method may include: receiving an Internet protocol (IP) address allocated from a first gateway included in the non-3GPP access network; and applying a non-access stratum (NAS) protocol to a first device managing mobility of the terminal through the IP address.

The receiving of the IP address allocated from the first gateway may include receiving a temporary IP address allocated from the first gateway.

The receiving of the IP address allocated from the first gateway may include creating an Internet protocol security (IPSec) with the first gateway.

The first gateway and the first device may be connected to each other.

The non-3GPP access network may be a wireless local area network (WLAN).

The non-3GPP access network may be an untrusted non-3GPP access network.

The receiving of the temporary IP address allocated from the first gateway may include receiving the temporary IP address allocated from the first gateway through an IPv6 auto-configuration method or a dynamic host configuration protocol (DHCP) method.

The creating of the IPSec tunnel may include: performing an Internet key exchange (IKE) security association (SA) process together with the first gateway; and performing an IPSec security association (SA) process together with the first gateway.

The applying of the NAS protocol may include: receiving a security mode command message from the first gateway through the IP address; and transmitting a security mode complete message to the first gateway through the IP address.

The applying of the NAS protocol may further include: receiving an attach accept message from the first gateway through the IP address.

Another exemplary embodiment of the present invention provides a method for accessing a core network through an Ethernet network by a terminal, including: performing media access control (MAC) communication with a first gateway included in the Ethernet network; and applying an NAS protocol to a first device supporting mobility of the terminal, through the MAC communication.

The first gateway and the first device may be connected to each other.

The applying of the NAS protocol may include applying the NAS protocol to the first device by adding Ether_Type to an Ethernet frame.

The applying of the NAS protocol may include applying the NAS protocol to the first device by using a specific MAC address.

An NAS stratum may be positioned on an MAC stratum in the terminal, and an NAS stratum may be positioned on an IP stratum in the first device.

Yet another exemplary embodiment of the present invention provides a terminal initially accessing a core network through a non-3GPP access network. The terminal may include a processor performing a control to receive an IP address allocated from a first gateway included in the non-3GPP access network and performing a control to apply an NAS protocol to a first device managing mobility of the terminal through the IP address; and a radio frequency (RF) module transmitting and receiving a message corresponding to the NAS protocol.

The IP address may be a temporary IP address allocated from the first gateway.

The IP address may be a temporary IP address allocated from the first gateway by creating an IPSec with the first gateway.

The first gateway and the first device may be directly connected to each other.

The processor may configure an NAS stratum to be positioned on an IP stratum.

According to an exemplary embodiment of the present invention, the NAS protocol is applied to the non-3GPP access network, thereby making it possible to provide seamless handover.

DETAILED DESCRIPTION OF THE EMBODIMENTS

Figure 1:
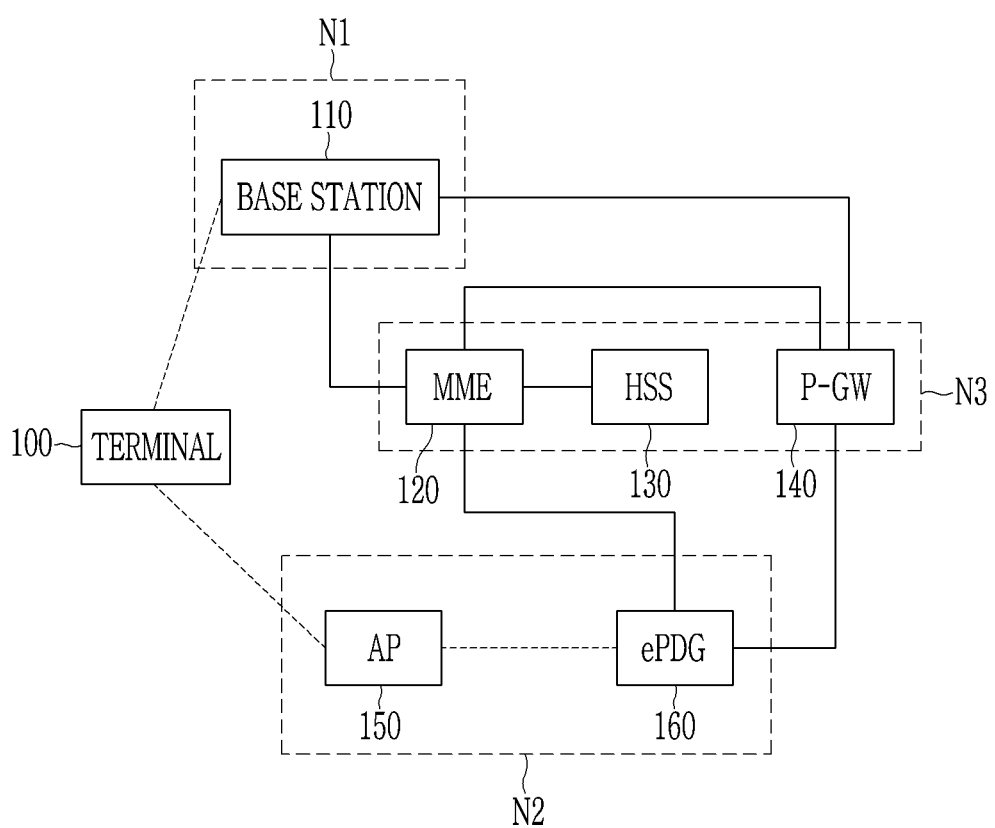
FIG. 1 is a view showing a network structure according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the present specification, a terminal may indicate a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), or the like, and may include all or some of the functions of the terminal, the MT, the AMS, the HR-MS, the SS, the PSS, the AT, the UE, or the like.

In addition, a base station (BS) may indicate an advanced base station (ABS), a high reliability base station (HR-BS), a nodeB, an evolved nodeB (eNodeB), a base transceiver station (BTS), a mobile multihop relay (MMR)-BS, a relay station (RS) serving as a base station, a high reliability relay station (HR-RS) serving as a base station, and the like, and may include all or some of the functions of the base station, the ABS, the nodeB, the eNodeB, the BTS, the MMR-BS, the RS, the HR-RS, and the like.

FIG. 1 is a view showing a network structure according to an exemplary embodiment of the present invention.

As shown in FIG. 1, the network structure according to an exemplary embodiment of the present invention includes a terminal 100, a base station 110, a mobility management entity (MME) 120, a home subscriber server (HSS) 130, a packet data network (PDN) gateway (P-GW) 140, an access point (AP) 150, and an evolved PDN gateway (ePDG) 160.

In FIG. 1, the base station 110 forms a $3^{rd}$ generation partnership project (3GPP) access network N1, and the AP 150 and the ePDG 160 form a wireless fidelity (WiFi) access network N2. In addition, the MME 120, the HSS 130, and the P-GW 140 form a core network N3. Here, although the WiFi access network (that is, a wireless local area network (WLAN)) is illustrated as an example of a non-3GPP access network, it may be replaced by other network such as a wired network. Here, the AP 150 may be a mobile type AP or a fixed type AP.

The MME 120 according to an exemplary embodiment of the present invention, which is an entity managing access and mobility of the terminal 100, and is an end point of non-access stratum (NAS) signaling. Therefore, the MME 120 enables the terminal 100 to access the core network providing mobility through the 3GPP or non-3GPP access network. In addition, the MME 120 establishes NAS signaling connection to perform mobility management. The MME 120 may be replaced by a term 'access and mobility function (AMF)'.

The ePDG 160 is an entity for interworking between the non-3GPP access network (for example, the WLAN) and the core network N3. The terminal 100 may access the core network N3 through the ePDG 160 in the non-3GPP access network. The ePDG 160 may allow the terminal 100 to transmit an NAS protocol to the core network N3. In order to provide the function as described above, the ePDG 160 is directly connected to the MME 120, as shown in FIG. 1. The ePDG 160 may be replaced by a term 'non-3GPP interworking function (N3IWF)'.

The P-GW 140 is connected to each of the base station 110, the MME 120, and the ePDG 160 and is also connected to a data network (not shown).

The terminal 100 according to an exemplary embodiment of the present invention supports the NAS protocol. The NAS protocol as described above is applied to the non-3GPP access network N2 as well as the 3GPP access network N1. Therefore, seamless handover may be provided regardless of an access network. That is, in an access method according to an exemplary embodiment of the present invention, the NAS protocol is also applied to the non-3GPP access network N2, thereby making it possible to provide mobility. Such an access method according to an exemplary embodiment of the present invention will be described below in detail.

Figure 2:
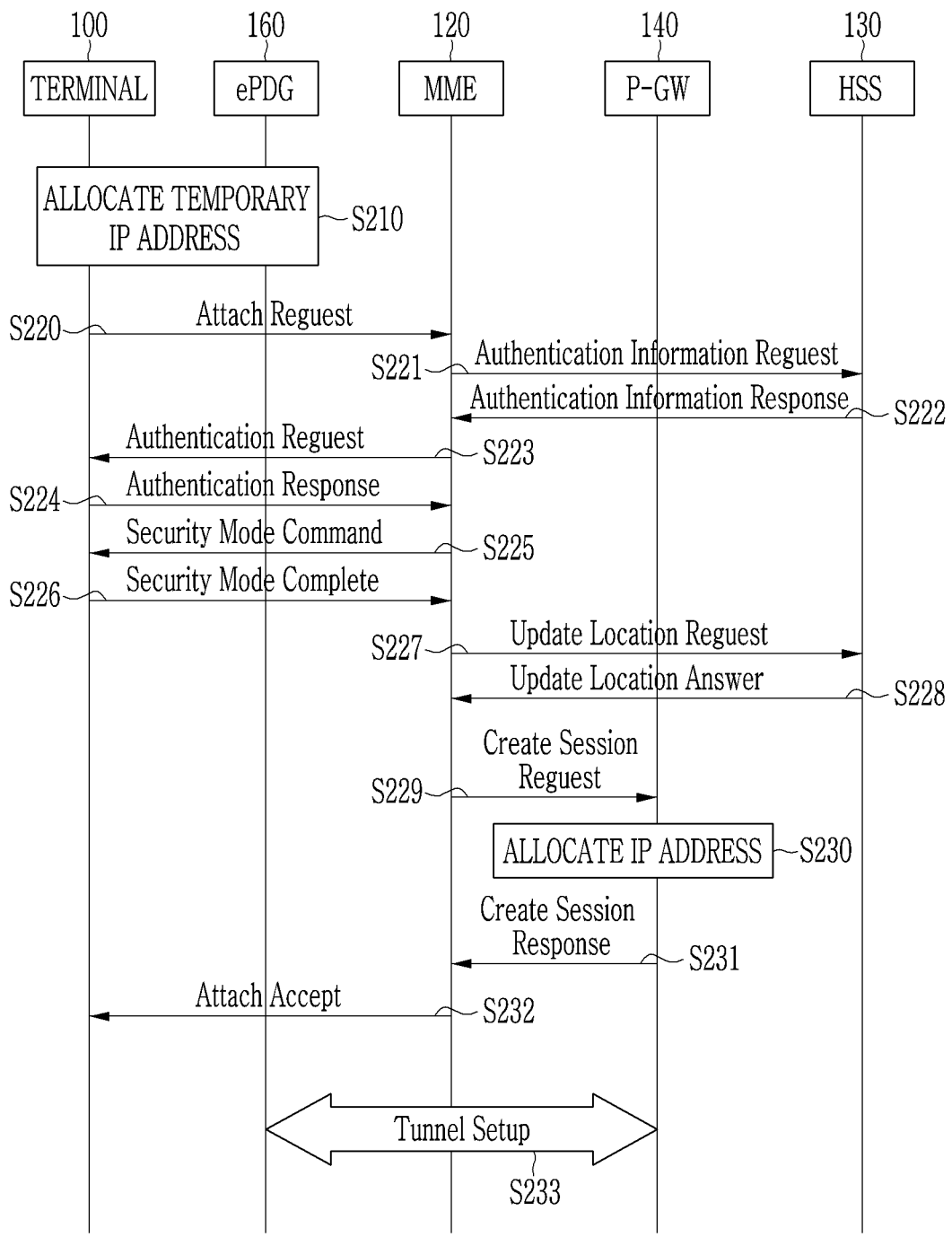
FIG. 2 is a view showing a non-access stratum (NAS) based access method according to an exemplary embodiment of the present invention.

FIG. 2 is a view showing a non-access stratum (NAS) based access method according to an exemplary embodiment of the present invention. In more detail, FIG. 2 shows procedures of applying the NAS protocol to the WiFi access network (the non-3GPP access network) to allow the terminal 100 to initially access the core network.

First, the terminal 100 performs communication with the ePDG 160 to receive a temporary Internet protocol (IP) address allocated thereto (S210). That is, in order to transfer an NAS message, IP communication is performed between the terminal 100 and the ePDG 160. In order to perform the IP communication, the terminal 100 receives the configured temporary IP address. As a method for configuring the temporary IP address, two methods may be used. A first method is a IPv6 auto-configuration method, and a second method is a dynamic host configuration protocol (DHCP) method.

In the IPv6 auto-configuration method, a stateless IPv6 address is configured. The terminal 100 transmits a router solicitation (RS) message to the ePDG 160 to inform the ePDG 160 of a network access. The ePDG 160 receiving the RS message configures the stateless IPv6 address as a network prefix value in a router advertisement (RA) message, and transmits the RA message to the terminal 100.

In the DHCP method, an IPv4 address value or an IPv6 address value is arbitrarily configured. The terminal 100 access the network to transmit a DHCP request message to the ePDG 160. The ePDG 160 receiving the DHCP request message allocates a temporary IP address, allows the allocated temporary IP address to be included in a DHCP request message, and transmits the DHCP request message including the allocated temporary IP address to the terminal 100.

The temporary IP address allocated as described above is used by a user (that is, a terminal) authenticated through an authentication procedure, and communication is not allowed with respect to a user IP address that is not authenticated. Meanwhile, the temporary IP address allocated in S210 is different from an IP address allocated to the terminal 100 by a P-GW 140 described below.

In the NAS based access method according to an exemplary embodiment of the present invention, the NAS protocol is applied using the temporary IP address allocated in S210. This will be described in detail below.

The terminal 100 transmits an attach request message to the MME for an initial access (S220).

The MME 120 receiving the attach request message requests the HSS 130 to transmit an authentication information request message for subscriber authentication (S221).

The HSS 130 receiving the authentication information request message creates an authentication vector for the user (that is, the terminal), allows the authentication vector to be included in an authentication information response message, and transmits the authentication information response message including the authentication vector to the MME 120 (S222).

The MME 120 obtaining the authentication vector for the user allows related information to be included in an authentication request message and transmits the authentication request message including the related information to the terminal 100 (S223), in order for the terminal 100 to create the authentication vector and perform network authentication. Here, the related information may be a partial value of the authentication vector.

The terminal 100 performs the network authentication using the related information included in the authentication request message, and creates the authentication vector of the terminal 100. The terminal 100 transmits the created authentication vector of the terminal 100 to the MME 120 through an authentication response message (S224). The MME 120 may authenticate the user using the received authentication response message.

When subscriber authentication succeeds, an NAS security setup procedure is performed between the MME 120 and the terminal 100. The MME 120 transmits a security mode command message to the terminal 100 (S225). The terminal 100 receiving the security mode command message creates an NSA security key, and transmits a security mode complete message to the MME 120 in order to inform the MME 120 that the creation of the NAS security key is completed (S226).

In order to inform the HSS 130 of the attachment of the terminal 100 and request the HSS to transmit subscription information, the MME 120 transmits an update location request message to the HSS 130 (S227).

The HSS 130 transmits the user subscription information to the MME 120 through an update location response message (S228).

Next, the MME 120 transmits a create session request message to the P-GW 140 (S229) in order to perform a session request.

The P-GW 140 receiving the create session request message allocates an IP address of the terminal 100 (S230). The P-GW 140 allows the allocated IP address to be included in a create session response message, and transmits the create session response message including the allocated IP address to the MME 120 (S231).

The MME 120 transmits an attach accept message to the terminal 100 (S232). Here, the attach accept message includes the IP address of the terminal 100 allocated by the P-GW 140.

A tunnel is finally created between the P-GW 140 and the ePDG 160 depending on the procedure described above (S223), and data transmission and reception are performed among the P-GW 140, the ePDG 160, and the terminal 100 through such a tunnel. That is, the NAS protocol is also applied to the non-3GPP access network N2 through the procedures described above, such that mobility management may be performed.

Meanwhile, even in the case in which the terminal 100 is connected to the base station 110 rather than the ePDG 160, the same procedures as those described above with reference to FIG. 2 are performed, such that NAS communication based on an IP instead of a radio resource control (RRC) may be performed. Therefore, according to an exemplary embodiment of the present invention, the NAS protocol may be applied on the basis of IP communication regardless of a kind of terminal interface (LTE, WiFi, wired, or the like).

Figure 3:
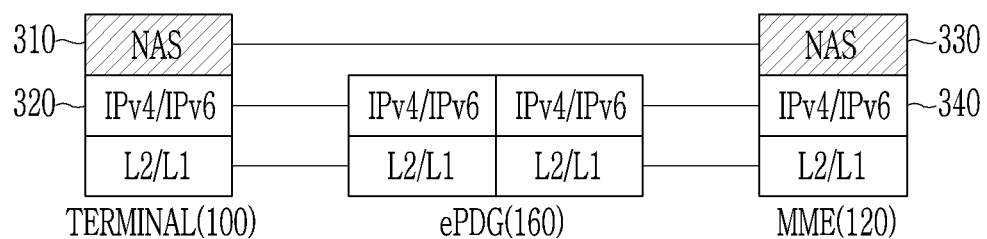
FIG. 3 is a view showing a protocol stack of a control plane for applying the NAS based access method according to an exemplary embodiment of the present invention.

FIG. 3 is a view showing a protocol stack of a control plane for applying the NAS based access method according to an exemplary embodiment of the present invention.

As shown in FIG. 3, an NAS stratum 310 is positioned on an IP stratum 320 in the terminal 100, and an NAS stratum 330 is positioned on an IP stratum 340 also in the MME 120. That is, the NAS protocol is used between the terminal 100 and the MME 120. In addition, each of the terminal 100 and the MME 120 performs the IP communication with the ePDG 160. Therefore, according to an exemplary embodiment of the present invention, an NAS message may be transferred in a state in which it is carried in the IP stratum.

Figure 4:
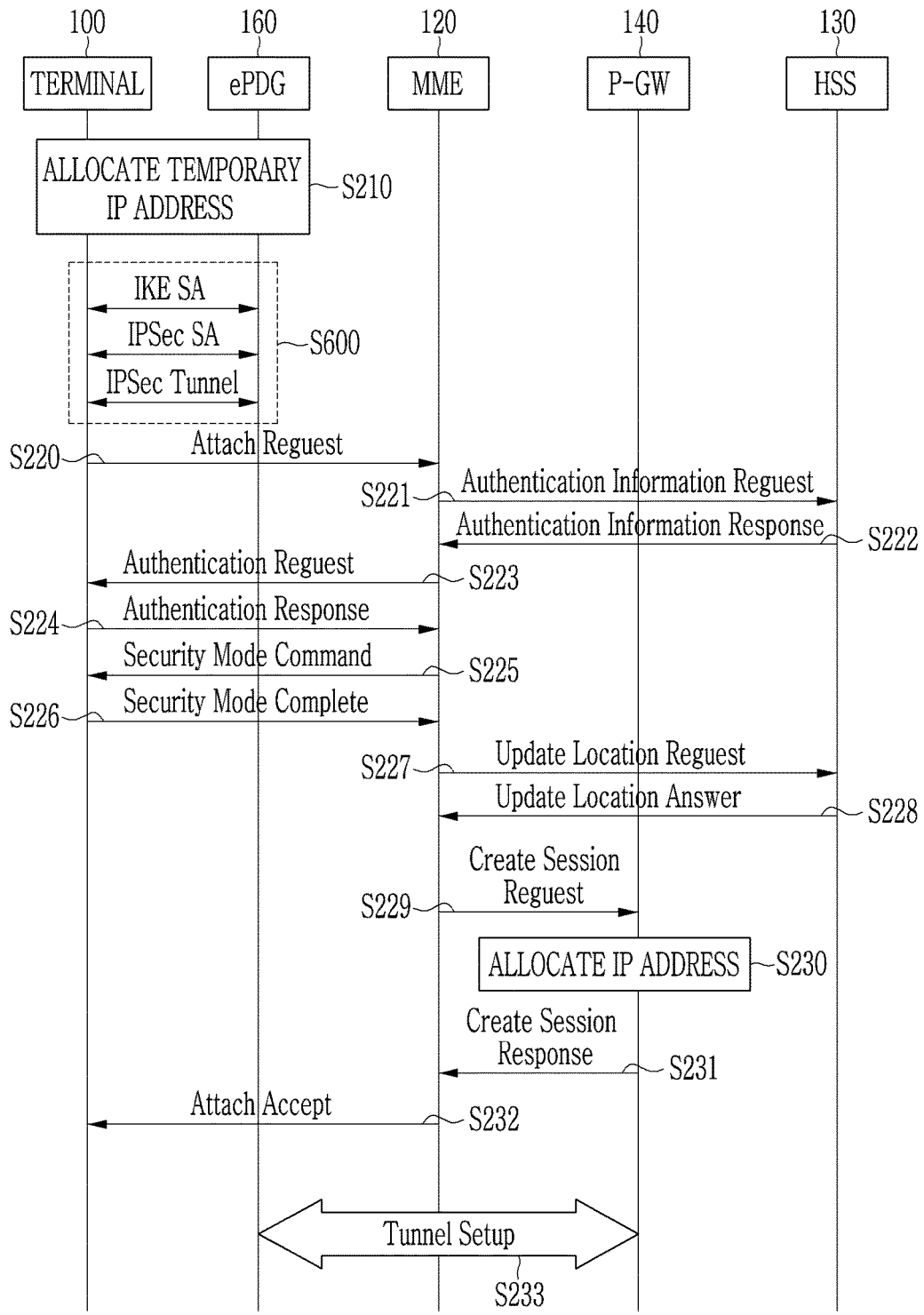
FIG. 4 is a view showing an NAS based access method according to another exemplary embodiment of the present invention.

FIG. 4 is a view showing an NAS based access method according to another exemplary embodiment of the present invention. In more detail, FIG. 4 shows procedures of applying the NAS protocol in an untrusted WiFi access network environment to allow the terminal 100 to initially access the core network.

As shown in FIG. 4, the NAS based access method according to another exemplary embodiment of the present invention is the same as that illustrated in FIG. 2 except that a process (S600) of creating an IPSec tunnel is added.

In order to perform authentication and negotiation between the terminal 100 and the ePDG 160, an Internet key exchange (IKE) security association (SA) process is performed. In such an IKE SA process, a master key is created, such that an IKE message is encrypted, and an encryption integrity algorithm negotiation and session key is created. Next, an IPSec SA is configured between the terminal 100 and the ePDG 160. The IPSec SA includes a key, an algorithm, and the like, used for encrypting and authenticating a packet. The IPSec SA is configured, security communication may be performed between the terminal 100 and the ePDG 160 through an IPSec tunnel.

Since procedures of FIG. 4 are the same as those of FIG. 2 except for S600, a detailed description therefor will be omitted. That is, in the NAS based access method according to another exemplary embodiment of the present invention, the NAS protocol may be applied between the terminal 100 and the MME 120 through the IPSec tunnel created in S600.

Figure 5:
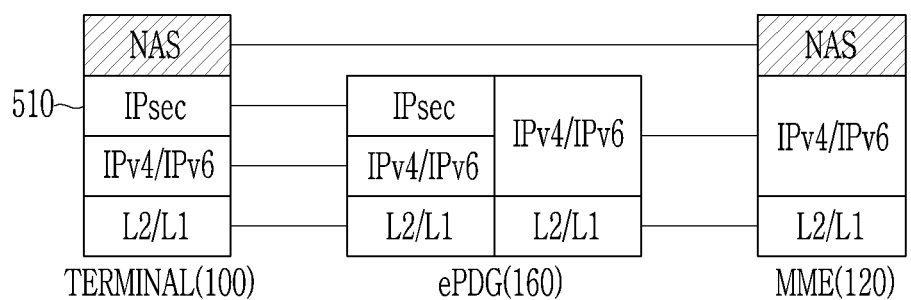
FIG. 5 is a view showing a protocol stack of a control plane for applying the NAS based access method according to another exemplary embodiment of the present invention.

FIG. 5 is a view showing a protocol stack of a control plane for applying the NAS based access method according to another exemplary embodiment of the present invention.

As shown in FIG. 5, an IPSec tunnel 510 is created between the terminal 100 and the ePDG 160, such that security may be provided. According to another exemplary embodiment of the present invention described above, the NAS message may be transferred in a state in which it is carried in an IP to which the security is added.

Figure 6:
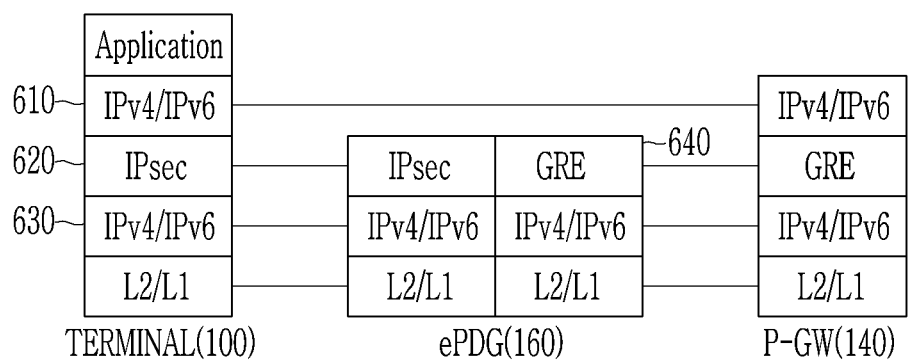
FIG. 6 is a view showing a protocol stack of a data plane for applying the NAS based access method according to an exemplary embodiment of the present invention.

FIG. 6 is a view showing a protocol stack of a data plane for applying the NAS based access method according to an exemplary embodiment of the present invention.

As shown in FIG. 6, communication may be performed between the terminal 100 and the P-GW 140 using the IP address 610 allocated by the P-GW 140 in S230 of FIG. 2. In addition, a temporary IP 630 may be used in IP communication for data communication between the terminal 100 and the ePDG 160, and an IPsec tunnel 620 may be used for safe communication. A generic routing encapsulation (GRE) tunnel 640 may be used in the data communication between the ePDG 160 and the P-GW 140.

Figure 7:
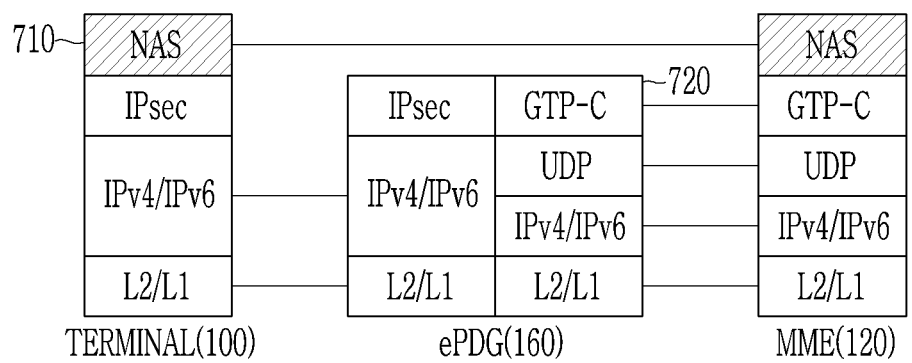
FIG. 7 is a view showing another example of a protocol stack of a control plane for applying the NAS based access method according to an exemplary embodiment of the present invention.

FIG. 7 is a view showing another example of a protocol stack of a control plane for applying the NAS based access method according to an exemplary embodiment of the present invention. That is, FIG. 7 shows a case in which a general packet radio service (GPRS) tunneling protocol (GTP) tunnel is used instead of a GRE tunnel.

As shown in FIG. 7, an NAS protocol is performed on the basis of IP communication between the terminal 100 and the ePDG 160, and an NAS message may be transferred through a GTP-C protocol 720 between the ePDG 160 and the MME 120.

In FIGS. 2 to 7, the case in which the NAS message is transferred through the IP communication between the terminal 100 and the ePDG 160 has been shown. The NAS message may be transmitted through a 801.11 media access control (MAC) frame between the terminal 100 and the ePDG 160, in addition to such a method. Such a method will be described with reference to FIGS. 8 and 9.

Figure 8:
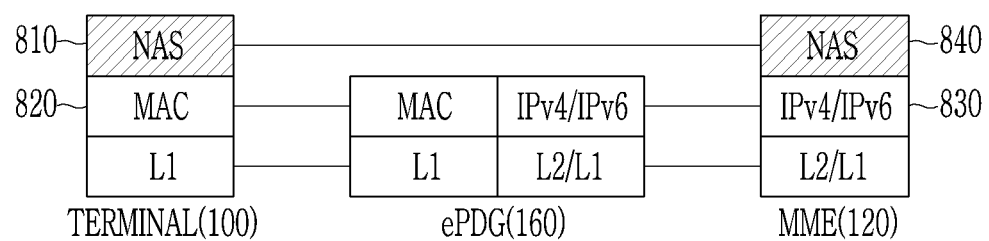
FIG. 8 is a view showing a protocol stack of a control plane for applying an NAS based access method according to yet another exemplary embodiment of the present invention.

FIG. 8 is a view showing a protocol stack of a control plane for applying an NAS based access method according to yet another exemplary embodiment of the present invention. That is, FIG. 8 shows a case in which an NAS message is transmitted through an MAC frame in an Ethernet network in which an IP is not supported.

As shown in FIG. 8, an NAS stratum 810 is positioned on an MAC stratum 820 in the terminal 100, and an NAS stratum 840 is positioned on an IP stratum 830 in the MME 120. MAC communication is performed between the terminal 100 and the ePDG 160, and IP communication is performed between the ePDG 160 and the MME 120. In addition, an NAS protocol is used between the terminal 100 and the MME 120. Therefore, according to yet another exemplary embodiment of the present invention, an NAS message is transmitted through the MAC communication between the terminal 100 and the ePDG 160.

There may be two methods for transmitting the NAS message between the terminal 100 and the ePDG 160. A first method is a method of newly adding Ether_Type to an Ethernet frame. In addition, a second method is a method of using a specific MAC address. According to yet another exemplary embodiment of the present invention as described above, the MAC frame may be used as it is without using the IP communication, in order to transfer the NAS message between the terminal 100 and the ePDG 160. Here, the well-known values defined as standards may be used as the Ether_Type or the specific MAC address or values defined with respect to each other as private values in a network may be used as the Ether_Type or the specific MAC address.

Figure 9:
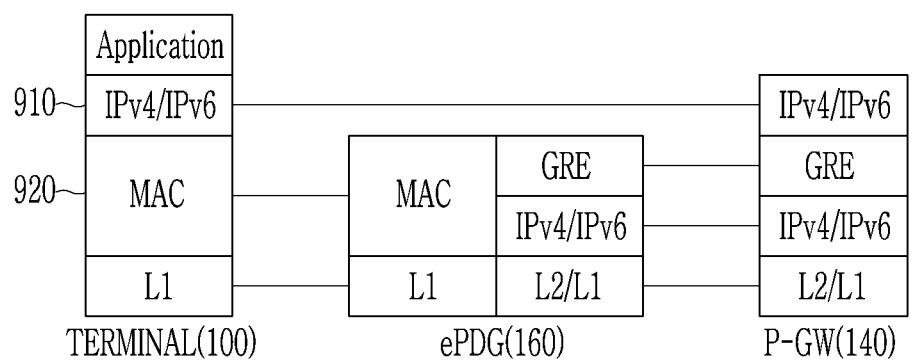
FIG. 9 is a view showing a protocol stack of a data plane for applying the NAS based access method according to yet another exemplary embodiment of the present invention.

FIG. 9 is a view showing a protocol stack of a data plane for applying the NAS based access method according to yet another exemplary embodiment of the present invention.

As shown in FIG. 9, an IP stratum 910 is positioned on an MAC stratum 920 in the terminal 100. That is, IP communication 910 may be used on an Ethernet frame 920 as it is. In addition, data communication between the terminal 100 and the ePDG 160 is performed through MAC communication 920 rather than the IP communication. Data communication between the terminal 100 and the P-GW 140 is performed through the IP communication 910.

Figure 10:
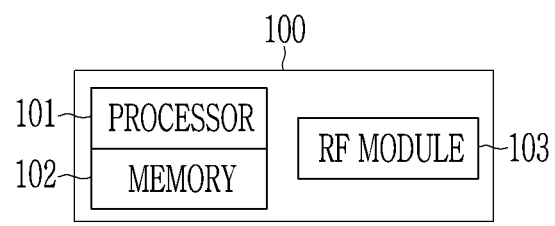
FIG. 10 is a view showing a terminal according to an exemplary embodiment of the present invention.

FIG. 10 is a view showing a terminal 100 according to an exemplary embodiment of the present invention.

As shown in FIG. 10, the terminal 100 according to an exemplary embodiment of the present invention includes a processor 101, a memory 102, and a radio frequency (RF) module 103.

The processor 101 is designed to implement the methods and the protocol stacks in FIGS. 1 to 9.

The memory 102 is connected to the processor 101, and stores various kinds of information related to operations of the processor 101 therein.

The RF module 103 is connected to an antenna (not shown), and transmits or receives wireless signals. In addition, the antenna may be implemented by a single antenna or a multi-antenna (a multi-input multi-output (MIMO) antenna).

According to the exemplary embodiments of the present invention described above, the NAS protocol is applied to the non-3GPP access network, thereby making it possible to provide the seamless handover as well as provide the mobility regardless of the access network.

Although the exemplary embodiment of the present invention has been described in detail hereinabove, the scope of the present invention is not limited thereto. That is, several modifications and alterations made by a person of ordinary skill in the art using a basic concept of the present invention as defined in the claims fall within the scope of the present invention.

What is claimed is:

1. A method for accessing a core network through a non-3$^{rd}$ generation partnership project (3GPP) access network by a terminal, the method comprising:
   receiving an Internet protocol (IP) address of the terminal from a first gateway included in the non-3GPP access network, wherein the IP address is allocated by the first gateway; and
   transmitting a non-access stratum (NAS) message to a first device managing mobility of the terminal via the first gateway by using the IP address,
   wherein the first gateway and the first device are directly connected to each other without any other gateway.

2. The method of claim 1, wherein the receiving of the IP address allocated from the first gateway includes receiving a temporary IP address allocated from the first gateway.

3. The method of claim 2, wherein the non-3GPP access network is a wireless local area network (WLAN).

4. The method of claim 2, wherein the receiving of the temporary IP address allocated from the first gateway includes receiving the temporary IP address allocated from the first gateway through an IPv6 auto-configuration method or a dynamic host configuration protocol (DHCP) method.

5. The method of claim 1, wherein the receiving of the IP address allocated from the first gateway includes creating an Internet protocol security (IPSec) with the first gateway.

6. The method of claim 5, wherein the non-3GPP access network is an untrusted non-3GPP access network.

7. The method of claim 5, wherein the creating of the IPSec tunnel includes:
   performing an Internet key exchange (IKE) security association (SA) process together with the first gateway; and
   performing an IPSec security association (SA) process together with the first gateway.

8. The method of claim 1, wherein the transmitting of the NAS message includes:
   receiving a security mode command message from the first device through the IP address; and
   transmitting a security mode complete message to the first device through the IP address.

9. The method of claim 8, wherein the transmitting of the NAS protocol further includes receiving an attach accept message from the first device through the IP address.

10. A terminal initially accessing a core network through a non-3GPP access network, the terminal comprising:
    a processor performing a control to receive an IP address of the terminal from a first gateway included in the non-3GPP access network and performing a control to transmit an NAS message to a first device managing mobility of the terminal via the first gateway by using the IP address, wherein the IP address is allocated by the first gateway; and
    a radio frequency (RF) module transmitting and receiving a message corresponding to the NAS protocol,
    wherein the first gateway and the first device are directly connected to each other without any other gateway.

11. The terminal of claim 10, wherein the IP address is a temporary IP address allocated from the first gateway.

12. The terminal of claim 10, wherein the IP address is a temporary IP address allocated from the first gateway by creating an IPSec with the first gateway.

13. The terminal of claim 10, wherein the processor configures an NAS stratum to be positioned on an IP stratum.

14. The terminal of claim 10, wherein the first gateway is a non-3GPP interworking function and the first device is an access and mobility management function.

15. The method of claim 1, wherein the first gateway is a non-3GPP interworking function and the first device is an access and mobility management function.

* * * * *